: 2,806,037
Patented Sept. 10, 1957

2,806,037

PROCESS FOR PRODUCING N-METHYL-α-PHENYL-α-METHYLSUCCINIMIDE

Charles A. Miller, Detroit, Mich., assignor to Parke, Davis & Company, Detroit, Mich., a corporation of Michigan No Drawing. Application December 20, 1955, Serial No. 554,144

3 Claims. (Cl. 260—326.5)

This invention relates to a process for producing N-methyl-α-phenyl-α-methylsuccinimide.

N-methyl-α-phenyl-α-methylsuccinimide is a very valuable product for the treatment of epilepsy, especially of the petit mal and psychomotive seizure type. This product has been prepared by reacting α-phenyl-α-methylsuccinic acid or α-phenyl-α-methylsuccinic anhydride with methylamine and heating of the resultant reaction product. This process suffers the disadvantage that α-phenyl-α-methylsuccinic acid and its anhydride are difficult to prepare and require the use of long synthetic procedures which produce poor yields of the desired starting materials. Consequently, the process is, from a commercial standpoint, quite expensive to utilize.

It is an object of the present invention to provide a process for producing N-methyl-α-phenyl-α-methylsuccinimide in good yields without utilizing α-phenyl-α-methylsuccinimic acid or its anhydride as a starting material.

Another object of the invention is to provide a process for producing N-methyl-α-phenyl-α-methylsuccinimide from a readily obtainable and cheap starting material.

Still another object of the invention is to provide a process by which N-methyl-α-phenyl-α-methylsuccinimide may be easily and cheaply produced.

In accordance with the invention these and other objects which will hereinafter appear are realized by reacting an ester of β-cyano-α-methyl-cinnamic acid with an alkali cyanide at a temperature above 70° C. to produce α-methyl-α-phenyl succinodinitrile, reacting the α-methyl-α-phenyl succinodinitrile with methylamine and heating the resultant reaction product. The chemical transformations which take place during the process can be diagrammatically represented as follows:

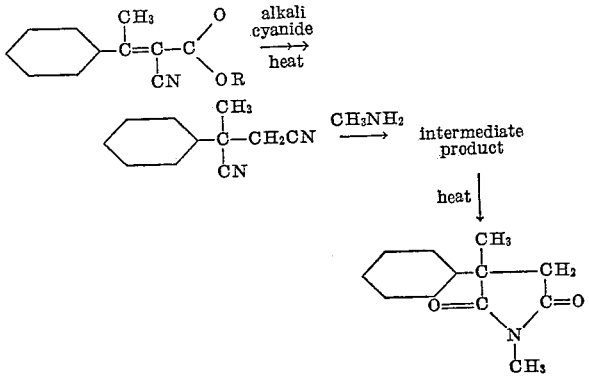

where R is a hydrocarbon group, preferably an alkyl group.

Carrying out the first phase of the process at least one equivalent of the alkali metal cyanide is used for each equivalent of the α-cyano-β-methylcinnamic acid ester. It is preferable to employ approximately equivalent quantities of the alkali cyanide and ester or to use a slight excess of the alkali cyanide, that is, a 10 to 20% excess. Larger amounts of the alkali cyanide can of course be used but it is preferable from the standpoint of cost and yields to keep the excess of the alkali cyanide small. Large amounts of the alkali cyanide tend to cause hydrolysis of the desired product and hence lower the yield. As alkali cyanides the cyanides of the alkali metals such as sodium and potassium cyanides are preferred. The reaction is carried out in a lower aliphatic alcohol or similar water-miscible organic solvent containing from about 5 to 50% water. The exact quantity of water is not critical but it should be sufficient to dissolve the alkali cyanide but not so large as to cause precipitation of the α-methyl-α-phenyl-succinodinitrile product. As a lower aliphatic alcohol, methanol, ethanol, isopropanol, n-propanol, n-butanol and the like can be employed. The temperature during the reaction is, as mentioned above, maintained above 70° C. The upper temperature limit is not critical and in practice it is customary to carry out the reaction at the boiling point of the reaction mixture. When such boiling point is below 70° C., for example, when methyl alcohol is used the reaction can be carried out under a positive pressure sufficient to raise the boiling point of the mixture to about 80 to 90° C. The preferred reaction temperature is in the neighborhood of 75 to 100° C. The reaction generally requires about twelve to twenty-four hours for completion with fifteen to eighteen hours being the optimum under most conditions. It will, of course, be appreciated that the reaction time can be varied and that the time necessary for completion will vary somewhat with the conditions employed.

The second phase of the process can be carried out without isolation or purification of the α-methyl-α-phenyl-succinodinitrile. Of course, if desired one may isolate and purify the α-methyl-α-phenylsuccinodinitrile before carrying out this phase of the process but this is not necessary and since it naturally entails some purification loss and expense it is usually not done when working on a commercial scale. The second phase of the process is performed by treating α-methyl-α-phenylsuccinodinitrile with methylamine in the presence of water at a temperature of 11–200° C. for several days. From the standpoint of economy it is preferable to employ commercially available aqueous methylamine solutions which serve to furnish both the necessary methylamine and water. Of course, if desired, methylamine can be added either to water or to a mixture of water and an alcohol. The water not only serves as a reactant but also as a solvent for the reaction. The solvent function can, as mentioned previously, be performed by alcohol if desired. In carrying out the reaction at least one equivalent of methylamine per equivalent of the α-methyl-α-phenylsuccinodinitrile is used. An excess of methylamine is permissible and, in fact, the best results are obtained by the use of two to three equivalents of methylamine. Excesses from three to six equivalents of methylamine do not have any marked adverse effect upon the yield nor do they serve to increase the yield over that obtained by the use of two to three equivalents.

As mentioned above, the second phase of the process is carried out at a temperature between 110 and 200° C. The preferred temperature is about 115 to 150° C. When using the preferred temperature the reaction time is between 4 to 7 days. When a higher temperature is used the reaction can be completed within about two days or three days and when a lower temperature is used, 110–115° C., about eight days are required for completion. Since at temperatures of 110 to 200° C. at least some of the reaction materials are gaseous, i. e. methylamine and water, the reaction is carried out in a suitable pressure vessel.

The nature of the product obtained in the second phase of the process is not known. It is believed that when two or more equivalents of methylamine are used that the product is principally the di-methylamide of α-methyl-α-phenylsuccinic acid. However, the exact composition of the product obtained in the second phase of the process is immaterial since this product is used directly without purification in the third phase of the process.

The third phase of the process is carried out by heating the reaction product obtained in the second phase of the reaction at 100 to 250° C. for a short time, that is about one-half hour to about four hours. In practice the most convenient method for carrying out this subsequent heating step is to simply evaporate the solvents and excess methylamine from the reaction mixture produced in phase two of the process and then heat the residual product between 110 and 250° C. at atmospheric pressure for a short time. Although temperatures as high as 250° C. can be used this is not necessary. Best results are obtained by the use of temperatures between 120 and 140° C. and by heating the reaction product from the second step of the process for about one to two hours.

This process not only utilizes a cheap and readily available starting material, an ester of α-cyano-β-methylcinnamic acid, but is simple and economical to carry out on an industrial scale. Moreover, good over-all yields of the desired N-methyl-α-phenyl-α-methylsuccinimide are obtained.

The invention is illustrated by the following examples.

Example 1

A mixture consisting of 93 g. of ethyl α-cyano-β-methylcinnamate, 32.5 g. of potassium cyanide, 300 ml. of ethanol and 50 ml. of water is heated for eighteen hours on a steam bath, cooled and the mixture filtered. The ethanol and water are evaporated from the filtrate to obtain the desired α-methyl-α-phenylsuccinodinitrile as a viscous amber-colored oil.

34 g. of crude α-methyl-α-phenylsuccinodinitrile (prepared as described above) and 80 ml. of a 29% aqueous solution of methylamine are placed in an autoclave, the autoclave sealed and the contents heated for six days at 120° C. The autoclave is opened, the solvents and excess methylamine distilled from the reaction mixture and the residue heated at 135° C. for one hour at atmospheric pressure. The residue is cooled, dissolved in 60 ml. of hot ethanol and the resulting solution decolorized with charcoal. 40 ml. of water is added to the decolorized ethanol solution, the mixture cooled and the crystalline N-methyl-α-phenyl-α-methylsuccinimide which separates is collected; yield 29 g. 71%; M. P. 51–3° C.

Example 2

34 g. of α-phenyl-α-methylsuccinodinitrile is heated at 120° C. in a closed autoclave with 65 ml. of 29% aqueous solution of methylamine for six days. The reaction mixture is removed from the autoclave and the solvents removed by distillation. The residue is heated until the internal temperature of the mass reached 135° C. and temperature maintained one hour. The residue dissolved in 60 ml. of hot ethanol. After charcoaling, 40 ml. of water is added to the hot ethanol solution and the desired N-methyl-α-phenyl-α-methylsuccinamide which separates on cooling is collected; yield 31.5 g. (77.5%); M. P. 51–3° C.

Example 3

17 g. of α-phenyl-α-methylsuccinodinitrile and 13 ml. of a 29% aqueous solution of methylamine are heated together in an autoclave at 120° C. for seven days. The reaction mixture is removed from the autoclave and heated in an open flask until the internal temperature of the reaction mass reaches 220° C. The temperature is maintained for one-half hour and, after cooling, the residue dissolved in 30 ml. of ethanol. The ethanol solution is decolorized with carbon and 20 ml. of water added to the hot decolorized solution. On cooling, the desired N-methyl-α-phenyl-α-methylsuccinimide separates as a tan colored solid; yield 9.5 g. M. P. 46–50° C. Recrystallization from 50% aqueous ethanol (40 ml.) yields 8.3 g. (40.8%) of the desired product; M. P. 51–3° C.

I claim:

1. Process for producing N-methyl-α-phenyl-α-methylsuccinimide which comprises reacting an ester of α-cyano-β-methylcinnamic acid with an alkali cyanide at a temperature above 70° C. reacting the α-methyl-α-phenylsuccinodinitrile so obtained with methylamine in the presence of water and heating the resultant reaction product.

2. Process for producing N-methyl-α-phenyl-α-methylsuccinimide which comprises reacting an ester of α-cyano-β-methylcinnamic acid with an alkali cyanide at a temperature above 70° C., reacting the α-methyl-α-phenylsuccinodinitrile so obtained with methylamine in the presence of water at a temperature between 110 and 200° C. in a closed vessel and heating the resultant reaction product at a temperature between 110 to 250° C.

3. Process for producing N-methyl-α-phenyl-α-methylsuccinimide which comprises reacting an ester of α-cyano-β-methylcinnamic acid with an approximately equivalent quantity of an alkali cyanide at a temperature above 70° C. in a water-miscible organic solvent containing 5 to 50% water, reacting the α-methyl-α-phenylsuccinodinitrile so obtained with two to three equivalents of methylamine in the presence of water at a temperature between 115 and 150° C. in a closed vessel and heating the resultant reaction product at a temperature between 110 to 250° C. at atmospheric pressure.

References Cited in the file of this patent

UNITED STATES PATENTS

| | | |
|---|---|---|
| 2,623,882 | Meyer | Dec. 30, 1952 |
| 2,643,257 | Miller et al. | June 23, 1953 |
| 2,717,261 | Krespan | Sept. 6, 1955 |

FOREIGN PATENTS

| | | |
|---|---|---|
| 1,117,980 | France | Mar. 5, 1956 |

OTHER REFERENCES

"An Outline of Org. Nitrogen Compounds," Degering University Lithographers, Ypsilanti, Michigan, page 651, 1945.